United States Patent
Svensson et al.

(10) Patent No.: US 12,553,407 B2
(45) Date of Patent: Feb. 17, 2026

(54) PORT-INJECTED ENGINE HAVING FUEL DISTRIBUTOR FOR REDUCED BIAS IN FUEL DISTRIBUTION

(71) Applicant: Caterpillar Inc., Peoria, IL (US)

(72) Inventors: Kenth I. Svensson, Peoria, IL (US); Jonathan W. Anders, Peoria, IL (US); William Barnes, Rapid City, SD (US); Jessie Marie Collins, Ludlow, SD (US)

(73) Assignee: Caterpillar Inc., Peoria, IL (US)

( * ) Notice: Subject to any disclaimer, the term of this patent is extended or adjusted under 35 U.S.C. 154(b) by 77 days.

(21) Appl. No.: 18/428,293

(22) Filed: Jan. 31, 2024

(65) Prior Publication Data
US 2025/0243836 A1    Jul. 31, 2025

(51) Int. Cl.
*F02M 61/14* (2006.01)
*F02M 35/10* (2006.01)
*F02M 69/04* (2006.01)

(52) U.S. Cl.
CPC ...... *F02M 61/14* (2013.01); *F02M 35/10216* (2013.01); *F02M 69/044* (2013.01)

(58) Field of Classification Search
CPC . F02M 61/14; F02M 35/10216; F02M 69/044
See application file for complete search history.

(56) References Cited

U.S. PATENT DOCUMENTS

| | | | |
|---|---|---|---|
| 5,694,898 A * | 12/1997 | Pontoppidan | F02M 69/047 |
| | | | 123/470 |
| 9,581,116 B2 | 2/2017 | McAlister | |
| 11,384,708 B1 | 7/2022 | Schroeder et al. | |
| 2016/0356253 A1* | 12/2016 | Noguchi | F02M 61/1853 |

FOREIGN PATENT DOCUMENTS

| | | |
|---|---|---|
| CN | 205135742 U | 4/2016 |
| CN | 108979925 A | 12/2018 |
| CN | 218717046 U | 3/2023 |
| GB | 2278639 A | 12/1994 |
| JP | 5035369 B2 | 9/2012 |

* cited by examiner

*Primary Examiner* — Xiao En Mo
(74) *Attorney, Agent, or Firm* — Brannon Sowers & Cracraft PC

(57) ABSTRACT

An engine system includes an engine housing including a plurality of intake valve openings, an intake port extending to the plurality of intake valve openings and an injector bore extending to the intake port. The engine system also includes a fuel system having a port fuel injector, and a fuel distributor having a baffle wall. The baffle wall extends into the intake port and extends at least partially around a fuel spray axis, forming a fuel channel and having at least one of a circumferentially varied porosity or an axially varied cross sectional area. The baffle wall shields fuel spray of an injected fuel such as methanol to limit a bias in distribution of fuel among the plurality of intake valve openings.

9 Claims, 4 Drawing Sheets

PORT-INJECTED ENGINE HAVING FUEL DISTRIBUTOR FOR REDUCED BIAS IN FUEL DISTRIBUTION

TECHNICAL FIELD

The present disclosure relates generally to a port-injected internal combustion engine, and more particularly to a fuel distributor in a port-injected engine limiting a bias in distribution of an injected fuel.

BACKGROUND

Internal combustion engines are used throughout the world in applications ranging from electric power generation to vehicle propulsion, operation of pumps, compressors, and other machinery. Known engine platforms operate on a variety of different fuels employing a variety of different fuel admission technologies. Direct-injection liquid fuel engines, such as those operating on diesel, directly inject a liquid fuel into engine cylinders for compression-ignition therein. Other fuel admission and delivery strategies deliver a liquid fuel at a port-injection location into intake ports. Various combinations and extensions of these strategies are well-known and widely used. Still other fueling strategies include fumigation admission, port-injection, and direct-injection of gaseous fuels in single fuel and dual fuel applications.

Recent research efforts have focused on the use of so-called alternative fuels in single fuel and dual fuel engines, including various alcohol fuels such as methanol. Strategies are known where methanol is directly injected into an engine and spark-ignited or ignited via combustion of a pilot fuel. Certain alcohol fuels tend to have a relatively high latent heat of vaporization. As a result, it can be challenging in some instances to vaporize liquid alcohol fuels to a desired extent, resulting in dripping or dribbling of fuel at certain points in an engine system. Moreover, the manner and extent to which certain fuels can be optimally distributed in a cylinder can vary based upon where and how the fuel is injected. As a result, a host of new challenges have arisen in connection with attempts to implement various alternative fuel operating strategies. One known engine system capable of operating on methanol is known from U.S. Pat. No. 11,384,708 B1 to Schroeder et al.

SUMMARY

In one aspect, an engine includes an engine housing having a cylinder formed therein, a plurality of intake valve openings, an intake port extending in an upstream to downstream direction to the plurality of intake valve openings, and an injector bore extending to the intake port. The engine further includes a fuel system having a port fuel injector within the injector bore defining a fuel spray axis, and a fuel distributor having a baffle wall. The baffle wall extends outwardly of the injector bore into the intake port and at least partially around the fuel spray axis. The baffle wall forms a fuel channel and has at least one of a circumferentially varied porosity or an axially varied cross-sectional area.

In another aspect, a method of operating an engine includes conveying intake air through an intake port in an upstream to downstream direction to a plurality of intake valve openings in an engine, and injecting a fuel into an intake port at a fuel admission location that is further than one of the plurality of intake valve openings from an air admission location of the intake port. The method further includes shielding fuel spray of the injected fuel from incoming intake air via a baffle wall of a fuel distributor extending at least partially around a fuel spray axis, and limiting a bias in distribution of fuel among the plurality of intake valve openings based on the shielding fuel spray of the injected fuel from incoming intake air.

In still another aspect, a fuel distributor for a port-injected engine includes a base having a base wall extending circumferentially around a longitudinal axis and forming a central opening for receiving a port fuel injector therein. The fuel distributor further includes a baffle wall extending from the base to a distal tip and at least partially around the longitudinal axis. The baffle wall forms a longitudinally extending fuel channel in communication with the central opening, and including an upstream air-impinged side, and a downstream side at least partially opened to the fuel channel between the base and the distal tip.

DETAILED DESCRIPTION

Figure 1:
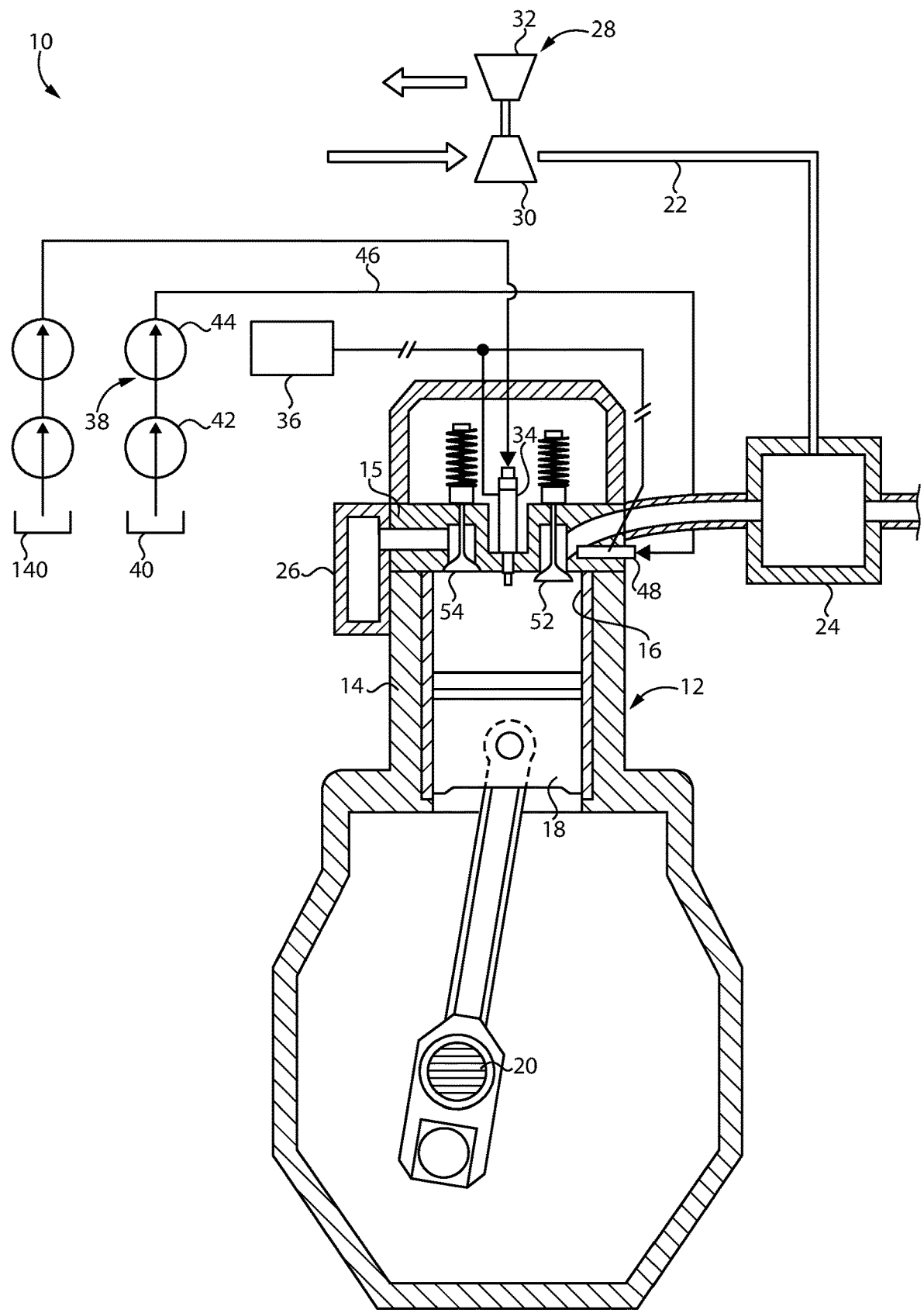
FIG. 1 is a diagrammatic view of an engine system, according to one embodiment.

Referring to FIG. 1, there is shown an internal combustion engine system 10, according to one embodiment. Engine system 10 includes an internal combustion engine 12 having an engine housing 14 including a cylinder head 15. Engine housing 14 has a cylinder 16 formed therein, and a piston 18 is movable in cylinder 16 between a bottom dead center position and a top dead center position in a generally conventional manner. Piston 18 is coupled to a crankshaft 20 rotatable to operate a load such as an electric generator, a pump, a compressor, or a driveline in a land vehicle or a marine vessel to name a few examples. Engine system 10 also includes an intake conduit 22 extending to an intake manifold 24. A turbocharger 28 includes a compressor 30 rotatable via a flow of exhaust through a turbine 32. An exhaust manifold is shown at 26 to feed exhaust to turbine 32, again in a generally conventional manner.

In FIG. 1 engine system 10 is illustrated including one cylinder 16, however, it will be appreciated that engine 12 may be a multi-cylinder engine having any number of cylinders in any suitable arrangement such as an in-line pattern, a V-pattern, or still another. As depicted, intake manifold 24 may distribute pressurized intake air to multiple cylinders. Engine system 10 further includes an igniter 34 for igniting a fuel in cylinder 16, coupled to an electronic control unit or ECU 36. Engine system 10 also includes a fuel system 38 having a fuel supply 40, a low-pressure pump 42, a high-pressure pump 44, and a fuel supply conduit 46.

Engine system 10 may be operated on a range of fuel types, including a liquid alcohol fuel such as methanol, or various blends including blends where methanol predominates. A dual fuel strategy where a port-injected liquid fuel is used in combination with a port-injected, manifold-injected, or fumigated gaseous fuel, for example, is within the scope of the present disclosure. In still other arrangements, engine system 10 might be configured with both a port fuel injector and a direct fuel injector, for example, injecting the same fuel. In another dual fuel implementation, igniter 34 may include a fuel injector structured to inject a pilot charge of a liquid fuel such as diesel from a fuel supply 140. The direct-injected liquid fuel can act as a pilot fuel to trigger ignition of a larger main charge of a fuel, such as a port-injected alcohol fuel. Engine system 10 might also be operated in a diesel-only mode where all fuel to be combusted is delivered via direct injection. In still other instances, igniter 34 may be a sparkplug.

Figure 2:
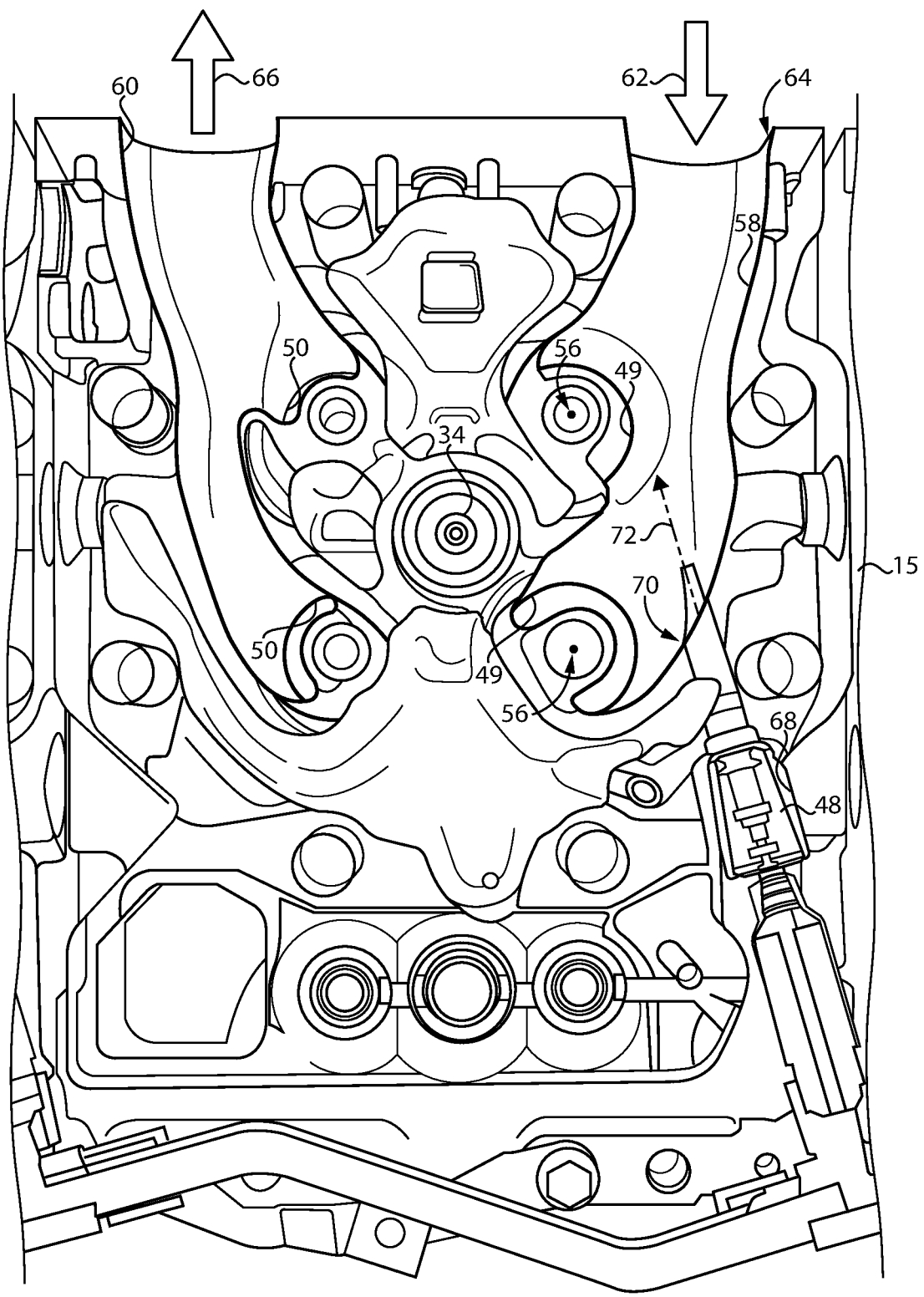
FIG. 2 is a sectioned top view of a portion of the engine system of FIG. 1.

Referring also now to FIG. 2, engine housing 14, more particularly cylinder head 15, includes therein a plurality of intake valve openings 49 defining center axes 56, and an intake port 58 extending in an upstream to downstream direction to intake valve openings 49. Cylinder head 15 also includes therein an injector bore 68 extending to intake port 58. An exhaust port is shown at numeral 60. Intake port 58 receives a flow of pressurized intake air 62 that is fed to intake valve openings 49. Exhaust valve openings 50 receive a flow of exhaust 66 out of cylinder 16 and feed the same out through intake port 60. FIG. 1 illustrates one exhaust valve 54 and one intake valve 52, and it will be appreciated engine 12 is typically configured with two exhaust valves and two intake valves per cylinder. Intake valve and exhaust valve opening and closing can occur in a generally conventional manner, including a 4-stroke engine cycle, although the present disclosure is not thereby limited.

Engine 12 may include a port-injected engine. To this end, fuel system 38 includes a port fuel injector 48 within injector bore 68 and defining a fuel spray axis 72. As can be noted from FIG. 2 fuel spray axis 72 advances upstream from a fuel admission location 70 in opposition to an incoming flow of intake air. It has been observed that fuel injected into an intake port can, at least at times, have a tendency to flow, influenced by a flow pressurized intake air, in a downstream direction and potentially predominantly through a closest intake valve opening.

Put differently, absent mitigation a bias in a distribution of fuel can be observed with fuel flowing at least predominantly, and sometimes almost entirely, though only one intake valve opening. As a result, fuel and air mixing in a cylinder can be less than optimal. Intake port 58 may define an air admission location 64. As noted above, injector bore 68 may define a fuel admission location 70. In the illustrated embodiment, fuel admission location 70 is further from air admission location 64 than one of the plurality of intake valve openings 49. Accordingly, absent mitigation a distribution of injected fuel could be expected to be biased, at least at times, to one of intake valve openings 49.

Figure 3:
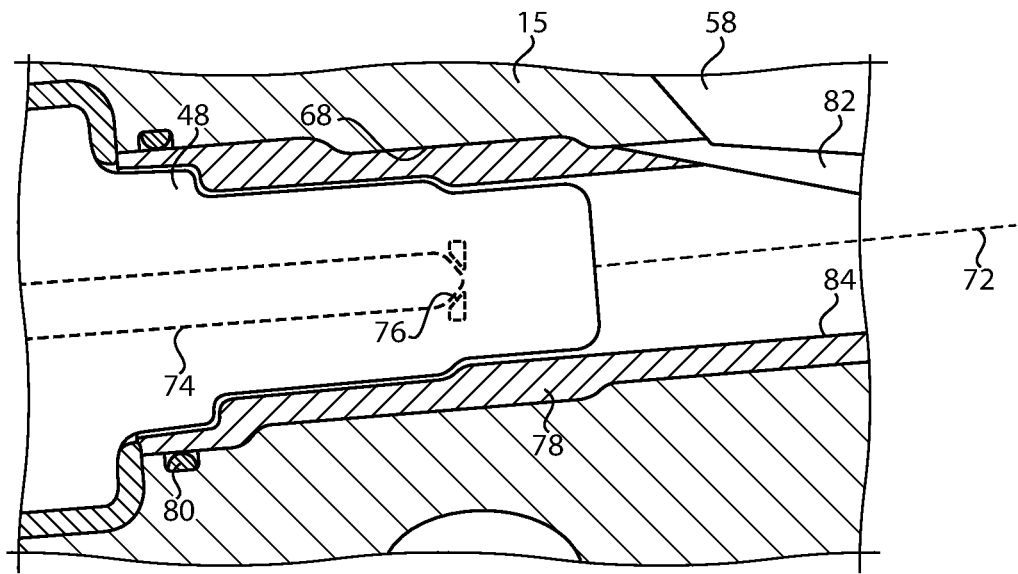
FIG. 3 is a sectioned side diagrammatic view of a portion of the engine system of FIG. 1.
Figure 4:
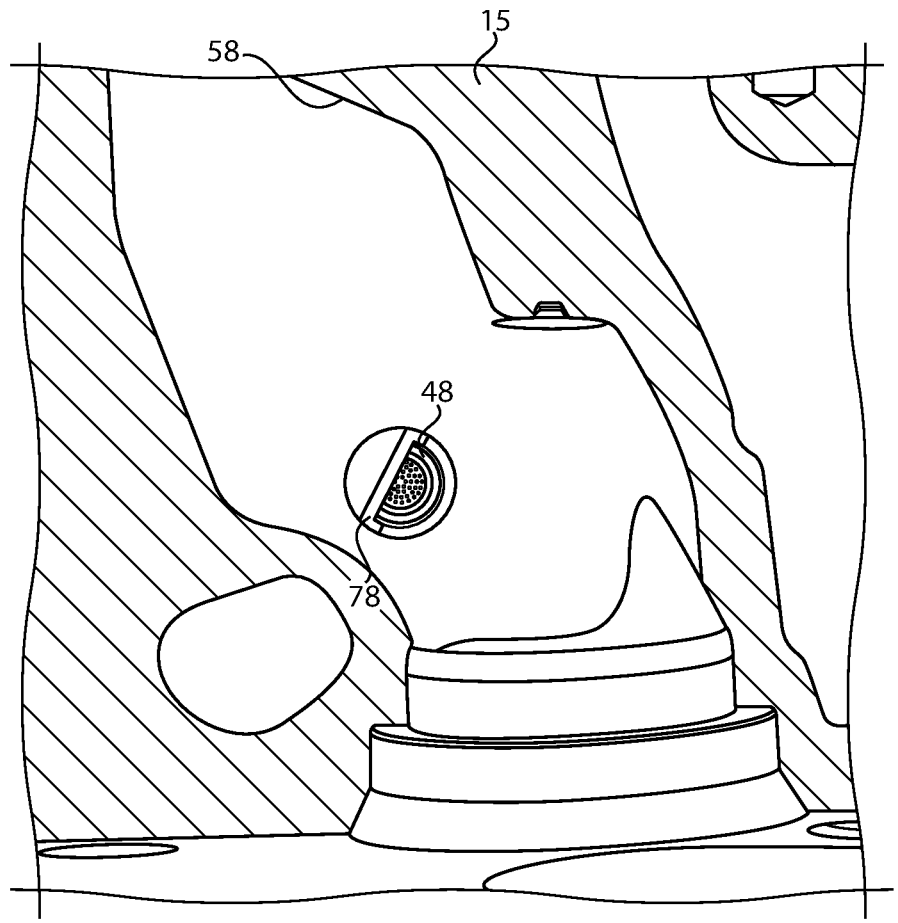
FIG. 4 is a sectioned view through a portion of a cylinder head according to one embodiment.

Referring now also to FIGS. 3 and 4, fuel system 38 further includes a fuel distributor 78 positioned and configured to limit a bias in distribution of fuel among the plurality of intake valve openings 49. As a result, a distribution of the port-injected liquid fuel can be expected to be more uniform between the two intake valve openings 49. Fuel distributor 78 includes a baffle wall 82. Baffle wall 82 extends outwardly of injector bore 68 into intake port 58 and at least partially around fuel spray axis 72. Baffle wall 82 forms a fuel channel 84 and has at least one of a circumferentially varied porosity or an axially varied cross-sectional area.

Focusing on FIG. 3, there can be seen port fuel injector 48 within injector bore 68 and situated within fuel distributor 78. An O-ring 80 forms a fluid seal between fuel distributor 78 and cylinder head 15. Port fuel injector 48 may include an injection valve 74 movable generally along fuel spray axis 72 to open and close a seat 76 to controllably inject fuel. It should be appreciated that the present disclosure is not limited with regard to port fuel injector configuration or operation. Port fuel injector 38 will nevertheless typically be electrically actuated and controlled via ECU 36.

Figure 5:
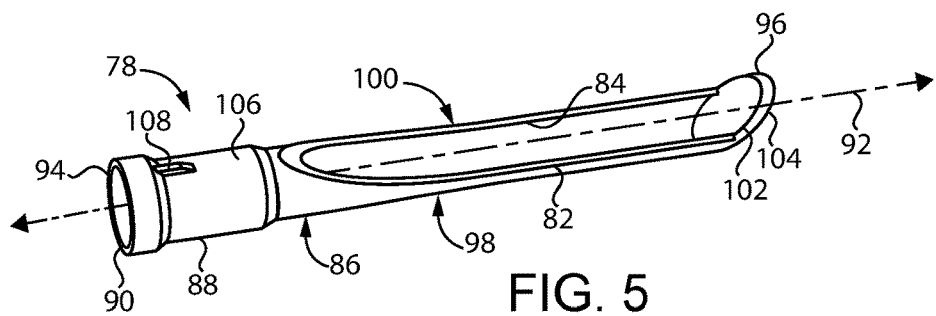
FIG. 5 is a diagrammatic view of a fuel distributor, according to one embodiment.
Figure 6:
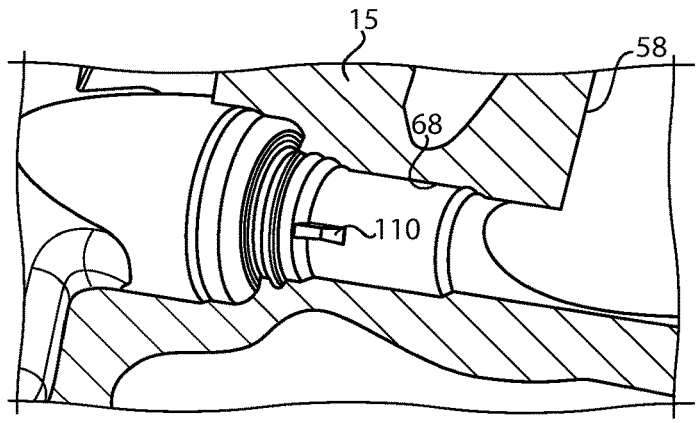
FIG. 6 is a sectioned view through a portion of a cylinder head according to one embodiment.

Referring also now to FIGS. 5 and 6, fuel distributor 78 may include an elongate, one-piece body 86. Body 86 may include a base 88 having a base wall 90 extending circumferentially around a longitudinal axis 92. Longitudinal axis 92 and fuel spray axis 72 may be colinear. Base wall 90 may further form a central opening 94 for receiving port fuel injector 48 therein. Baffle wall 82 extends from base 88 to a distal tip 96 and extends at least partially around longitudinal axis 92. As noted above, baffle wall 82 forms a longitudinally extending fuel channel 84. Fuel channel 84 is in communication with central opening 94. Baffle wall 82 also includes an upstream air-impinged side 98 and a downstream side 100. Downstream side 100 may be at least partially open to fuel channel 84 between base 88 and distal tip 96.

When positioned for service in cylinder head 15, upstream air-impinged side 98 is oriented generally towards an incoming flow of pressurized intake air, and downstream side 100 oriented generally away from the incoming flow of pressurized intake air. It is believed the configuration of fuel distributor 78 shields fuel spray of injected fuel from incoming intake air via baffle wall 82 so as to enable fuel spray to penetrate further and not be blown downstream entirely or predominantly towards a closer, downstream intake valve opening 49.

In the embodiment illustrated in FIG. 5, baffle wall 82 includes a cross-sectional area that is reduced in size in a direction of distal tip 96. It can also be noted baffle wall forms, at least at certain locations, a C-shape in cross-section. As also shown in FIG. 5 fuel distributor 78 may include a deflector 102 forming distal tip 96. Deflector 102 may include a deflection surface 104 having an airflow-impinged surface 104 oriented transverse diagonally to fuel spray axis 72 and longitudinal axis 92. It can be envisioned that incoming intake air can be deflected somewhat away from distal tip 96 by way of impingement upon surface 104, preventing intrusion of the incoming intake air into fuel channel 84.

As also shown in FIG. 5, fuel distributor 78 and one-piece body 86, referred to at times interchangeably herein, will further include an outer cylindrical surface 106 upon base 88. Fuel distributor 78 may further include a locating feature 108 formed on base 88. In the illustrated embodiment, locating feature 108 includes a protrusion upon cylindrical outer surface 106 that is axially extending and matingly fits within a slot 110 formed in cylinder head 15 as shown in FIG. 6. A locating feature as contemplated herein includes a key, a pin, a fin, or any other structural arrangement whereby fuel distributor 78 is capable of being fitted in cylinder head 15 in a finite number of angular orientations, and typically only in one orientation. The arrangement shown facilitates installing fuel distributor 78 in injector bore 68 at a prescribed angular orientation that positions shielding wall 82 and fuel channel 84 appropriately for service consistent with the aims discussed herein. Various alternative arrangements for angularly orienting fuel distributor 78 as desired are contemplated, such as where a protruding locating feature is formed on cylinder head 15 and a slot is formed in fuel distributor 78. Still further variations can include a regular or a non-regular polygonal shape to base 88 and a complementary shape to injector bore 68, or potentially indelible markings upon one or both of fuel distributor 78 or cylinder head 15. Fuel distributor 78 might also be angularly oriented in or upon fuel injector 48 based upon a geometric relationship with fuel injector 48 analogous to the above examples and others not specifically listed. In one implementation fuel distributor 78 is interference-fitted with cylinder head 15 within injector bore 68. In still another contemplated embodiment fuel distributor 78 is fitted within injector bore 68 by way of a threaded engagement of threads upon fuel distributor 78 and cylinder head 15 within injector bore 68.

It will be recalled baffle wall 82 may be configured such that downstream side 100 is at least partially open to fuel channel 84. Baffle wall 82 may include a cross-sectional area that is reduced in size in a direction of distal tip 96, permitting fuel spray to advance initially through a closed part of fuel channel 84, and be more gradually exposed to intake port 58 as the fuel spray travels outward of port fuel injector 48 through fuel channel 84.

Figure 7:
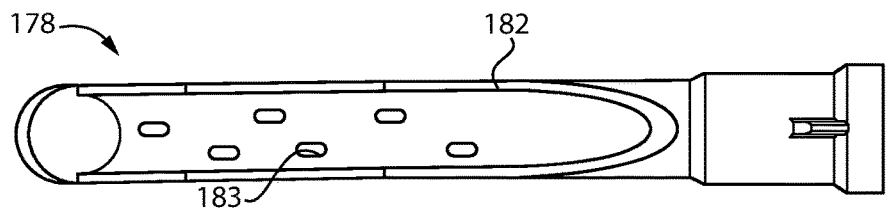
FIG. 7 is a diagrammatic view of a fuel distributor, according to one embodiment.
Figure 9:
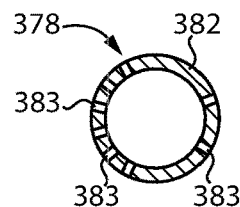
FIG. 9 is a sectioned view of a fuel distributor, according to one embodiment.

Other embodiments contemplate permitting some incoming intake air to flow directly into fuel channel 84. Referring to FIG. 7, there is shown an alternative embodiment of a fuel distributor 178 where openings 183 are formed in a baffle wall 182 to permit some flow of intake air that interacts with the fuel spray. FIG. 9 illustrates another embodiment of a fuel distributor 378 where a baffle wall 382 could be considered fully circumferential of a fuel spray axis, but varied circumferentially in porosity. As shown, baffle wall 382 may include openings 383 that define an increased porosity upon one side of baffle wall 382 and a more limited or zero porosity upon an upstream side of baffle wall 382. In the illustration, the upstream side could be considered the right side of fuel distributor 378 in FIG. 9, and the downstream side considered the left side of fuel distributor 378 in FIG. 9.

Figure 8:
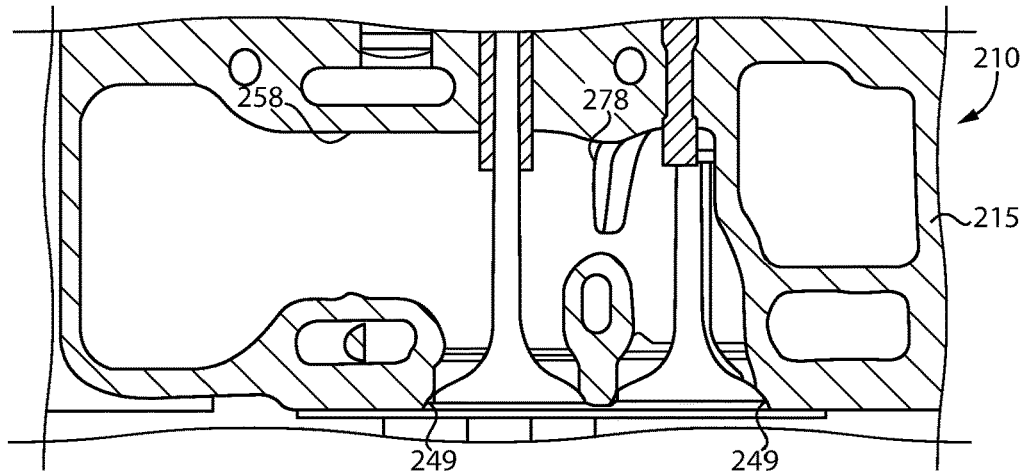
FIG. 8 is a sectioned diagrammatic view through a portion of an engine system according to one embodiment.

FIG. 8 illustrates yet another embodiment of an engine system 210 including a cylinder head 215 and an intake port 258 extending to intake valve openings 249. Whereas in the embodiments discussed above fuel is injected in a fuel spray path that is generally in opposition to a flow of incoming intake air, in the embodiment of FIG. 8 a direction of fuel injection may be generally across and/or with the flow of intake air. A fuel distributor 278 is shown arranged to provide shielding of injected fuel spray from an incoming flow of intake air, to enable substantially equal distribution of injected fuel to the two intake valve openings.

INDUSTRIAL APPLICABILITY

Referring to the drawings generally, but returning focus to the embodiment of FIGS. 1-6, operating engine 12 can include conveying intake air through intake port 58 in an upstream to downstream direction to a plurality of intake valve openings 49 in engine 12. A fuel, such as methanol, is injected into intake port 58 at fuel admission location 70. It will be recalled that fuel admission location 70 may be further downstream from air admission location than one of the plurality of intake valve openings 49. Further downstream can be understood to mean further linearly as measured relative to a central axis of intake port 58. Fuel distributor 78 via baffle wall 82 shields fuel spray of the injected fuel from the incoming intake air. The port-injected fuel can be ignited in cylinder 16 such as via a compression-ignited pilot charge of a liquid fuel direct-injected via igniter 34.

As discussed herein, the shielding of the fuel spray can limit a bias in distribution of the injected fuel among the plurality of intake valve openings 49, and ultimately result in a more uniform fuel delivery of the port-injected liquid fuel. As also noted above, certain fuels including methanol may be relatively more difficult to rapidly vaporize upon injection, and the shielding of the fuel spray can provide for a better opportunity for breaking up of injected fuel droplets and transitioning of the liquid fuel to vapor.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having" or the like are intended to be open-ended terms. Further, the phrase "based on" is intended to mean "based, at least in part, on" unless explicitly stated otherwise.

What is claimed is:

1. An engine comprising:
   an engine housing having a cylinder formed therein, a plurality of intake valve openings, an intake port extending in an upstream to downstream direction to the plurality of intake valve openings, and an injector bore extending to the intake port;
   a fuel system including a port fuel injector within the injector bore defining a fuel spray axis, and a fuel distributor having a baffle wall; and
   the baffle wall extending outwardly of the injector bore into the intake port and at least partially around the fuel spray axis, and the baffle wall forming a fuel channel and having at least one of a circumferentially varied porosity or an axially varied cross-sectional area.

2. The engine of claim 1 wherein:
   the intake port defines an air admission location, and the injector bore defines a fuel admission location; and
   the fuel admission location is further from the air admission location than one of the plurality of intake valve openings.

3. The engine of claim 2 wherein the fuel spray axis advances upstream from the fuel admission location in opposition to an incoming flow of intake air.

4. The engine of claim 1 wherein the baffle wall is part circumferential of the fuel spray axis.

5. The engine of claim 4 wherein the baffle wall includes the axially varied cross-sectional area, and the axially varied cross-sectional area is reduced in size in a direction away from the injector bore.

6. The engine of claim 1 wherein the fuel distributor includes a base and a distal tip, and the fuel channel is open, in a downstream direction, between the base and the distal tip.

7. The engine of claim 6 wherein the fuel distributor includes a distal deflector having an airflow-impinged surface oriented transverse diagonally to the fuel spray axis.

8. The engine of claim 6 wherein the base includes a cylindrical base fitted within the injector bore.

9. The engine of claim 1 wherein the fuel distributor is key-fitted with at least one of the engine housing or the port fuel injector within the injector bore.

* * * * *